United States Patent [19]

Knohl et al.

[11] Patent Number: 4,749,321
[45] Date of Patent: Jun. 7, 1988

[54] SEALING FASTENER

[75] Inventors: Rudolph E. Knohl, Bartlett; Ernest W. Reinwall, McHenry, both of Ill.

[73] Assignee: Elco Industries, Inc., Rockford, Ill.

[21] Appl. No.: 42,260

[22] Filed: Apr. 24, 1987

[51] Int. Cl.4 .............................................. F16B 35/00
[52] U.S. Cl. ..................... 411/371; 411/369; 411/377; 411/429
[58] Field of Search ........ 411/369, 368, 371, 373–375, 411/377, 429–431, 184–187

[56] References Cited

U.S. PATENT DOCUMENTS

| | | | |
|---|---|---|---|
| 1,208,620 | 12/1916 | Moser | 411/301 |
| 1,867,354 | 7/1932 | Dickson | 411/377 |
| 3,099,456 | 7/1963 | Hopp | 411/542 X |
| 3,241,422 | 3/1966 | Heimovics | 411/371 |
| 3,288,015 | 11/1966 | Hanneman | 85/47 |
| 3,313,197 | 4/1967 | Knohl | 85/9 |
| 3,399,589 | 9/1968 | Breed | 411/369 X |
| 3,452,636 | 7/1969 | Cohen et al. | 411/37 |
| 3,500,712 | 3/1970 | Wagner | 85/1 |
| 3,557,654 | 1/1971 | Weidner, Jr. | 411/378 |
| 3,566,738 | 3/1971 | Cuplt | 411/369 |
| 3,618,444 | 11/1971 | Kay et al. | 411/373 |
| 3,693,495 | 9/1973 | Wagner | 411/377 |
| 3,803,972 | 4/1974 | Deutsher | 411/337 |
| 3,897,712 | 8/1975 | Black | 85/9 |
| 3,910,331 | 10/1975 | Randall | 411/968 X |
| 4,041,834 | 8/1977 | Herkes et al. | 85/45 |
| 4,154,138 | 5/1979 | Melone | 411/373 |
| 4,235,147 | 11/1980 | Weidner, Jr. | 411/396 |
| 4,295,767 | 10/1981 | Temple, Jr. | 411/377 |
| 4,452,556 | 6/1984 | Nelson et al. | 411/377 |
| 4,460,300 | 7/1984 | Bettini et al. | 411/910 X |
| 4,482,278 | 11/1984 | Dorn | 411/377 |
| 4,576,533 | 3/1986 | Chartier | 411/373 |

FOREIGN PATENT DOCUMENTS

| | | | |
|---|---|---|---|
| 2242858 | 3/1973 | Fed. Rep. of Germany | 411/369 |
| 2024854 | 1/1979 | Fed. Rep. of Germany | 411/373 |
| 2227468 | 11/1974 | France | 411/369 |
| 2398913 | 3/1979 | France | 411/373 |
| 2113337 | 8/1983 | United Kingdom | 411/369 |

Primary Examiner—Lloyd A. Gall
Assistant Examiner—Curtis B. Brueske
Attorney, Agent, or Firm—Leydig, Voit & Mayer, Ltd.

[57] ABSTRACT

A sealing fastener includes an insert made of metal such as steel and a cap made of a non-ferrous and non-corrosive material such as aluminum. The cap is formed around and is captivated on the upper end portion of the insert by an impact extrusion process. The insert is formed with a head-retaining portion, a flange and a threaded shank. During impact extrusion, the cap is molded over the head-retaining portion and the top of the flange, around the peripheral edge of the flange and under the marginal portion of the underside of the flange. The upper side of the flange is formed with angularly spaced grooves and the outer edge of the flange is formed with scallops to help prevent the cap from turning relative to the insert when the fastener is tightened.

3 Claims, 2 Drawing Sheets

4,749,321

SEALING FASTENER

BACKGROUND OF THE INVENTION

This invention relates to a fastener which includes an insert made of a metal such as steel and having a head-retaining portion, a threaded shank and a flange between the two. The fastener also includes a cap encapsulating at least the head-retaining portion of the insert and made of a non-ferrous material such as zinc, aluminum or plastic. Thus, the part of the fastener which is covered by the cap is corrosion resistant. The head-retaining portion of the insert is polygonal in cross-section and the cap fits closely around this and is formed with surfaces which may be engaged by an ordinary wrench. Thus, when the cap is turned, the insert also is turned to drive the threaded shank into the work. In use, a resiliently flexible sealing washer is disposed beneath the flange and, when the fastener is tightened, the washer is flattened against the work to form a seal around the shank.

SUMMARY OF THE INVENTION

The general aim of the present invention is to provide a new and improved fastener of the above type in which the cap is more securely interlocked with the metal insert so as to prevent the cap from turning relative to the insert when high torque is applied to the cap during final tightening of the fastener.

A more detailed object of the invention is to achieve the foregoing by providing a fastener in which the flange of the insert is uniquely grooved and scalloped so as to intimately engage the material of the cap and prevent relative turning of the cap and the insert.

The invention also resides in the novel shape of the grooves in the flange to promote interlocking of the flange with the cap.

These and other objects and advantages of the invention will become more apparent from the following detailed description when taken in conjunction with the accompanying drawings.

DETAILED DESCRIPTION OF THE PREFERRED EMBODIMENT

Figure 1:
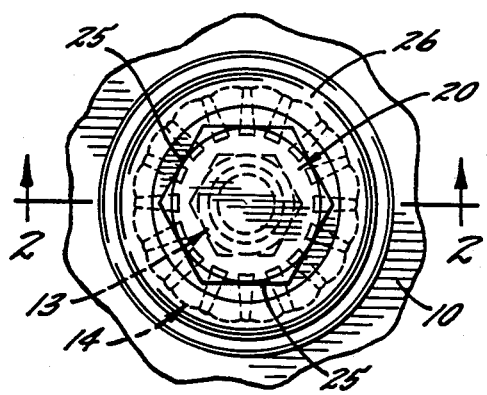
FIG. 1 is a top plan view of a new and improved fastener incorporating the unique features of the present invention.

As shown in the drawings for purposes of illustration, the invention is embodied in a corrosion-resistant fastener in the form of a screw such as is commonly used to secure a sheet metal roof panel 10 and a layer 11 of insulation to a support frame (not shown). The screw includes an elongated metal insert 12 (FIG. 2) having a head-retaining portion 13, a flange 14 beneath the head-retaining portion and an elongated shank 15 extending below the flange, the three elements 13, 14 and 15 being coaxial. The lower end portion of the shank 15 is formed with the usual drill tip 18 and, between the drill tip and the flange 14, self-tapping threads 19 are formed on the shank. The threads extend up on the shank close to the flange 14 of the insert 12 to enable the fastener to grip thin portions of work such as the roof panel 10.

To provide corrosion resistance, a cap 20 of a non-ferrous material encapsulates the head-retaining portion 13 of the insert 12 and a part of the flange 14 of the insert and closely conforms to the head-retaining portion so that the insert turns when the head is turned. The non-ferrous cap 20 includes a head portion 24 which encapsulates the head-retaining portion 13 of the insert 12. Surfaces 25 (FIG. 1) are formed on the head portion 24 to be engaged by a tool (not shown) for turning the cap and hence the insert. Herein, the surfaces are on the side of the head portion 24 and are six in number so as to form a conventional hexagon for a socket wrench. The cross-sectional shape of the head-retaining portion 13 also is hexagonal and the head portion 24 conforms closely with this portion so that the insert 12 turns with the cap 20. Because of the shape of the head-retaining portion 13, the insert 12 may be removed from the work with a wrench if the cap 20 breaks.

Figure 2:
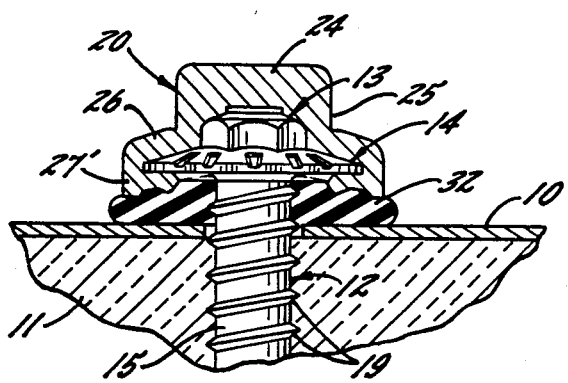
FIG. 2 is a sectional view taken along the line 2—2 of FIG. 1.

The lower end portion of the cap 20 is formed with a radially extending flange portion 26 (FIG. 3) which overlies the upper surface 27 of the flange 14 of the insert 12. An axially extending flange or skirt 27' extends downwardly from the flange portion 26 and encircles the outer edge 28 of the flange 14. Another flange portion 29 extends in from the skirt 27' and under the periphery of the underside of the flange 14 leaving an exposed annular surface 30 on such flange. The latter surface coacts with the shank 12, the flange portion 29 and the skirt 27' to define an annular recess 31 for receiving a resilient sealing washer 32 (FIG. 2). The latter is made of a resilient material such as rubber or plastic and its uncompressed outer diameter is substantially the same as the inside diameter of the recess 31 so as to fit into the recess. Thus, when the shank 15 is projected through a hole in the roof panel 10, and through the insulation layer 11 and is threaded into the support frame, the washer is compressed and seals around the hole and the adjacent threads 19 (see FIG. 2).

Figure 3:
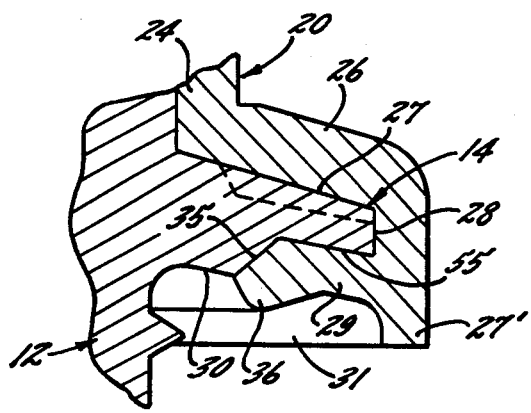
FIG. 3 is an enlarged fragmentary sectional view similar to FIG. 2 but omitting the sealing washer.
Figure 4:
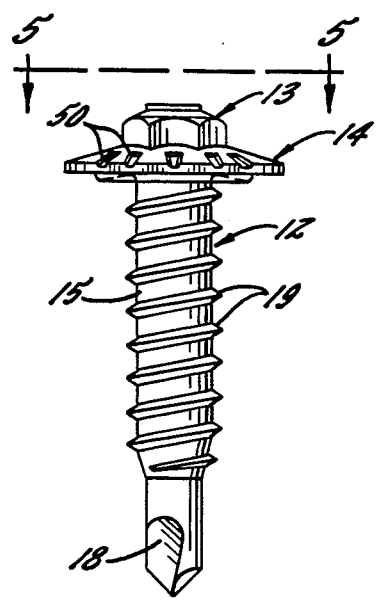
FIG. 4 is a side elevational view of the insert of the fastener.

As shown most clearly in FIG. 3, the flange 14 of the insert 12 is generally frustoconical and its upper surface 27 defines a continuous and convex frustum. A step 35 is formed on the underside of the flange 14 between the peripheral edge 28 thereof and the annular surface 30. Below the step, the flange portion 29 of the cap 20 is formed with a circular rib 36 which is concentric with and spaced radially inwardly from the skirt 27'. As described more fully in commonly assigned copending U.S. application Ser. No. 556,555, filed Nov. 30, 1983, tightening of the fastener causes the rib 36 to force the washer 32 radially inwardly so that it compresses completely around the shank 15, against the entire underside of the recess 31 including the annular surface 30 and against the surface of the sheet 10 around the hole therein. Upon final tightening of the fastener, the washer is flattened into and conforms to the shape of the recess as shown in FIG. 2.

Figure 8:
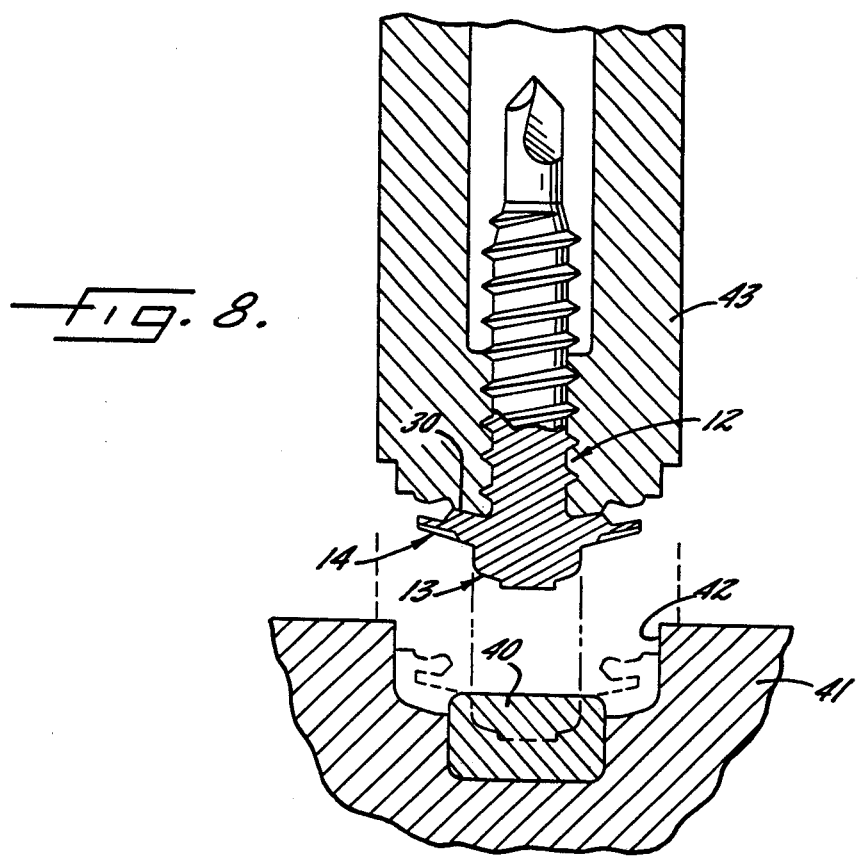
FIG. 8 is a view showing the preferred method of forming the corrosion-resistant cap of the fastener and of joining the cap to the insert.

While the cap 20 could be molded or cast around the insert 12, it preferably is formed into encapsulating relation with the insert by an impact extrusion process. As illustrated in FIG. 8, a slug 40 of non-ferrous metal such as aluminum is placed in a die 41 having a cavity 42 which conforms generally in shape to the external shape of the cap 20. The insert 12 is threaded into the lower end portion of a power-actuated ram 43. When the ram is closed against the die, the head 13 and the flange 14 of the insert 12 impact against the aluminum slug 40 and force the metal thereof to flow into conformity with the head, the flange and the die cavity 42 as shown in phantom lines in FIG. 8. As a result, the aluminum cap 20 is formed into encapsulating relation with the upper end portion of the insert. Of course, other non-ferrous metal such as zinc could be used instead of aluminum and, in addition, the cap could be made of plastic and injection molded around the upper end portion of the insert.

Figure 5:
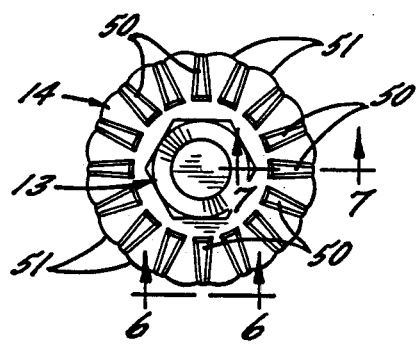
FIG. 5 is a top plan view taken along the line 5—5 of FIG. 4.
Figure 6:
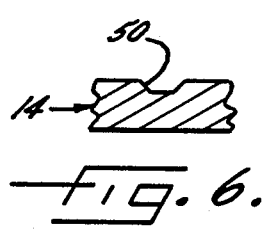
FIGS. 6 and 7 are enlarged fragmentary sectional views taken substantially along the lines 6—6 and 7—7, respectively, of FIG. 5.

In accordance with the invention, the flange 14 of the insert 12 is uniquely shaped so as to coact with the flange portion 26 and the flange or skirt portion 27 of the cap 20 and help hold the cap from turning on the insert when the fastener is tightened. For this purpose, the upper surface 27 of the flange 14 is formed with several (e.g., sixteen) angularly spaced and radially extending grooves 50 which interlock with the material of the cap 20. As shown most clearly in FIG. 5, each groove is generally trapezoidal in shape and includes a relatively wide inner end located short of the head-retaining portion 13. Each groove extends outwardly to the extreme outer edge 28 of the flange 14 and, as the groove progresses outwardly, it tapers in angular width. In cross-section, each groove appears substantially as shown in FIG. 6.

In addition to the grooves 50, the flange 14 is formed with scallops 51 (FIG. 5) which help hold the cap 20 against turning on the insert 12. Herein, the scallops 51 are spaced angularly around the outer edge 28 of the flange 14 and are formed as an incident to cold heading the flange and the head-retaining portion 13 of the insert 12. The scallops are convex between the grooves 50 and are concave at the outer ends of the grooves.

With the foregoing arrangement, the soft aluminum of the cap 20 flows into and fills the grooves 50 when the insert 12 is impacted against the aluminum slug 40. Moreover, the aluminum flows into the "valleys" of the scallops 51. As a result, there is an intimate interlocking engagement of the cap 20 with the flange 14 so as to prevent turning of the cap relative to the insert 12 when the cap is subjected to high final tightening torque.

Because each of the grooves 50 is relatively wide at its inner end and narrow at its outer end, the aluminum of the cap 20 tends to wedge into the grooves so as to increase the hold between the insert 12 and the cap 20. Moreover, the generally trapezoidal shape of the grooves stiffens the flange 14 and reduces the likelihood of the skirt 27 flaring outwardly if the skirt is driven at an angle to the work.

Figure 7:
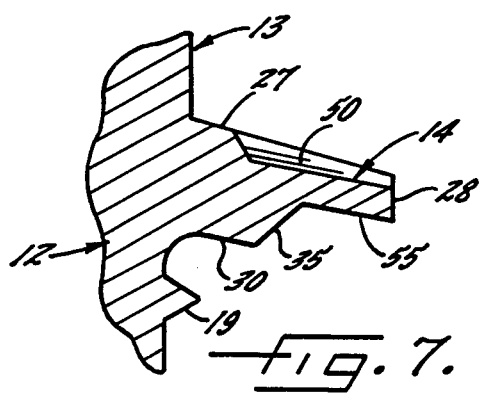

As shown most clearly in FIG. 7, the lower side 55 of the flange 14 is inclined at an angle of about 10 degrees relative to a plane extending perpendicular to the axis of the fastener. As a result of such angle, the aluminum of the cap 20 is trapped against the lower side of the flange 14 and is restricted from moving outwardly during final tightening of the fastener or if the fastener is driven at an angle. The annular surface 30 also is inclined at an angle of about ten degrees and helps hold the insert 12 in alignment with the ram 43 (see FIG. 8) during the impact extrusion operation.

We claim:

1. A fastener comprising a one-piece metal insert having a head-retaining portion; having a generally circular and radially extending flange under said head-retaining portion; and having an elongated threaded shank beneath said flange, said head-retaining portion being polygonal in cross section, said flange having an outer diameter substantially larger than both the diameter of said shank and the largest transverse dimension of said head-retaining portion, and a cap of non-ferrous material, said cap having a head portion which encapsulates the head-retaining portion of said insert and having a flange portion surrounding the flange of the insert, said head portion having surfaces adapted to engage a driving tool for turning the fastener, said head portion closely conforming to said head-retaining portion of said insert whereby the insert turns with the cap, said flange portion completely enclosing the upper side and outer edge of the flange on said insert and extending under the outer periphery of the lower side of the flange, said flange having an exposed annular surface on its lower side between said shank and said flange portion of said cap, said flange portion and said annular surface forming a downwardly facing annular recess for receiving a resilient sealing washer, the upper side of said flange being substantially frustoconical, a series of angularly spaced and radially extending grooves formed in the upper side of said flange, said grooves receiving the non-ferrous material of the flange portion of said cap to help lock said cap and said insert against relative turning, each of said grooves terminating short of said head-retaining portion of said insert and having an inner end of predetermined angular width, each of said grooves tapering in angular width upon progressing radially outwardly toward the outer edge of said flange of said insert, and the outer edge of said flange being scalloped and engaging the non-ferrous material of the flange portion of said cap to further help hold said cap and said insert against relative turning.

2. A fasterner as defined in claim 1 in which each of said grooves is generally trapezoidal in shape.

3. A fastener as defined in claim 1 in which the outer end of each groove is coextensive with the outer edge of said flange of said insert.

* * * * *